Sept. 25, 1945.    J. F. O'BRIEN    2,385,375
FEED SECTION UNIT FOR ELECTRIC WIRING SYSTEMS
Filed May 12, 1942    2 Sheets-Sheet 1
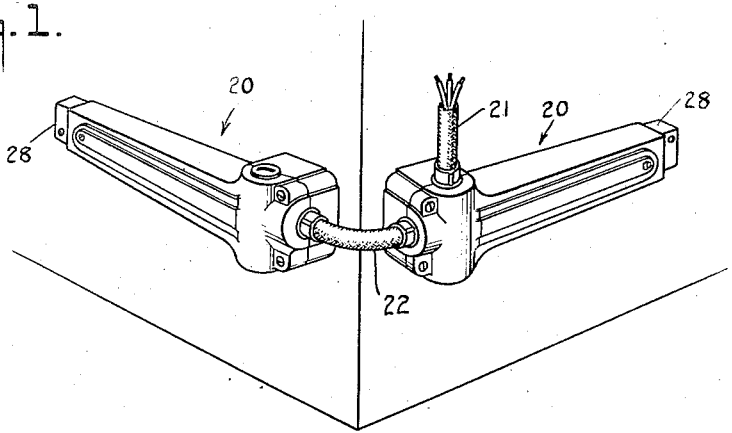
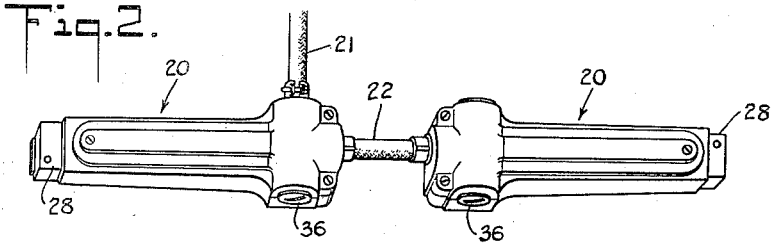
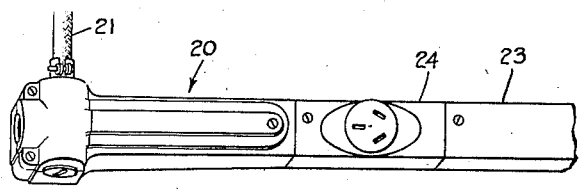
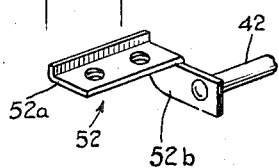
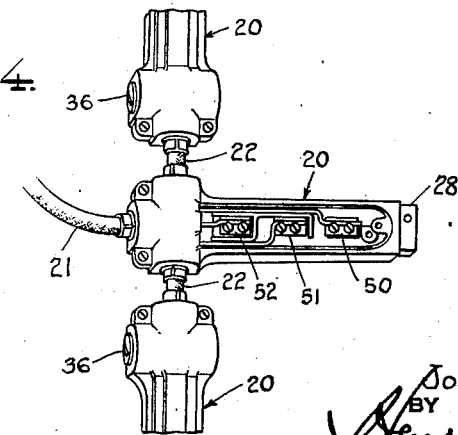
INVENTOR
Joseph F. O'Brien
BY
HIS ATTORNEY Sept. 25, 1945.   J. F. O'BRIEN   2,385,375
FEED SECTION UNIT FOR ELECTRIC WIRING SYSTEMS
Filed May 12, 1942   2 Sheets-Sheet 2
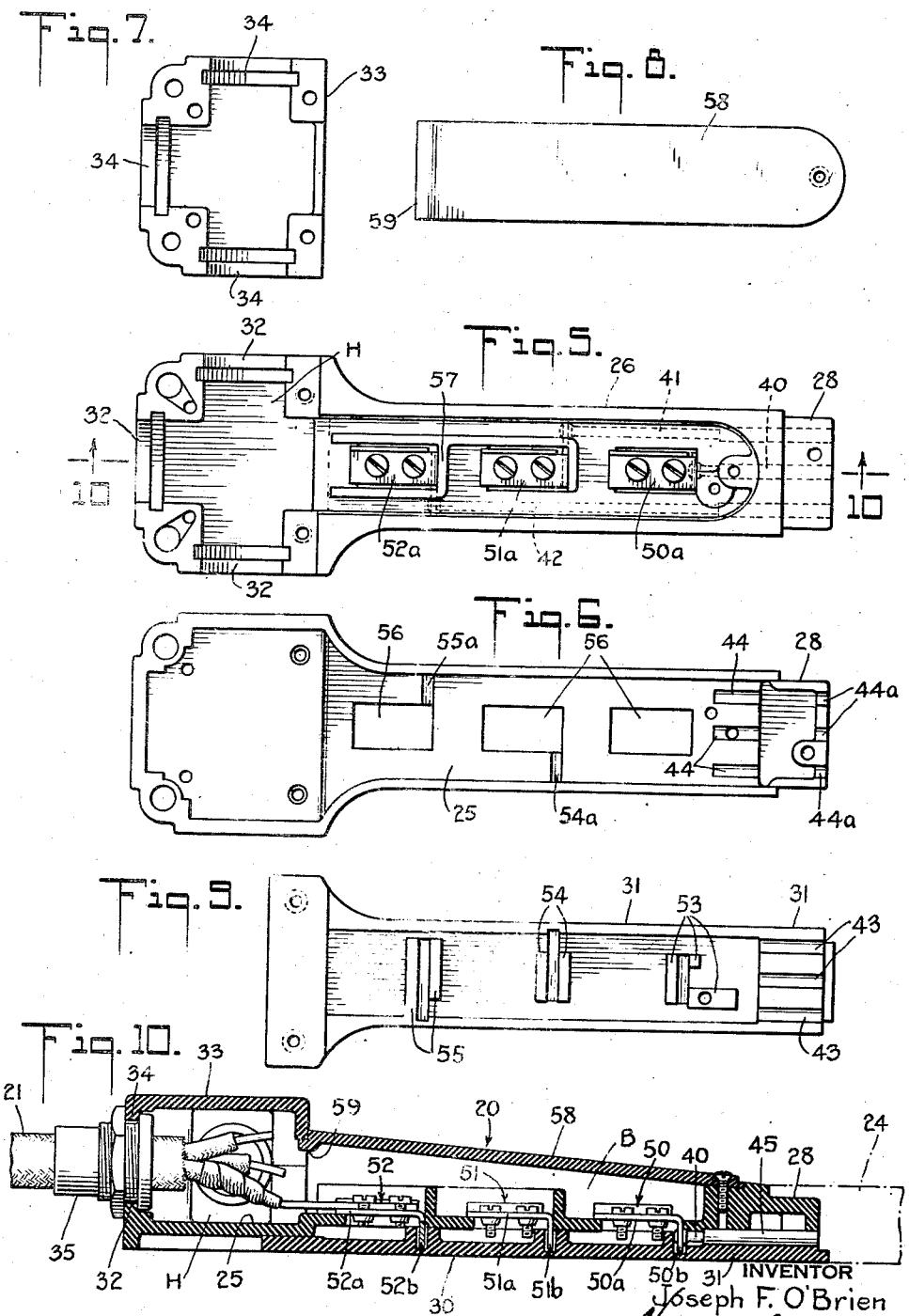
INVENTOR
Joseph F. O'Brien
BY
Henry J. Lucke
HIS ATTORNEY Patented Sept. 25, 1945

2,385,375

UNITED STATES PATENT OFFICE 2,385,375

FEED SECTION UNIT FOR ELECTRIC WIRING SYSTEMS

Joseph F. O'Brien, Jersey City, N. J., assignor to John B. Pierce Foundation, New York, N. Y., a corporation of New York Application May 12, 1942, Serial No. 442,594

5 Claims. (Cl. 173—334.1)

This invention relates to electric wiring devices, and particularly, to feed sections into which power feed lines may be brought.

In my presently co-pending application Serial No. 398,030, filed June 14, 1941, now U. S. Letters Patent No. 2,351,631, dated June 20, 1944, there is disclosed a wiring system comprising a plurality of conductor-containing units arranged for seriatim electrical and mechanical interconnection to provide a continuous electric wiring system of whatever length is desired. Such units may be positioned on a wall surface and suitably secured thereto. The present invention relates to improved means for connecting such a wiring system to a source of electric power.

Among the objectives of my invention are:

To provide an improved feed section for an electric wiring system;

To provide a feed section which permits the introduction of power source conductors thereinto at a plurality of optional locations;

To provide a feed section which may be used as a common feed junction for a plurality of wiring systems;

To provide a feed section which may serve as the end section of a wiring system of interconnected unit sections;

To provide a feed section which may be used, optionally, with two-conductor or three-conductor wiring systems; and To provide a feed section which may serve as an end section of a wiring system for interconnection with a similar feed section of a second wiring system, whereby a plurality of individual wiring systems may be mutually interconnected and served from a common source of electric power.

In a preferred embodiment, the invention includes an elongate body structure having a configuration and cross sectional dimension similar to the adjacent conductor units, and adapted to mechanically interconnect therewith without visible break or offset.

At an end of such elongate body is a hollow junction head having a volumetric capacity suitable to receive several mutually interconnected electricity conductors. Preferably, said head has an approximately cruciform configuration, to present at least three "branches" through which electricity conductors may be introduced into the hollow head. Such "branches" may have access openings closed by suitable removable plugs. Disposed within the body, and preferably beneath an insulating wall which forms the base of a connection well, are electricity conductors, matching in number, the electricity conductors of the adjacent conductor unit of the wiring system. To each of the conductors in the said body, there is secured a suitable binding post, preferably having clamping screws or equivalent disposed within the connection well. The connection well is accessible from the front of the body, and may be closed by a removable cover plate.

Electricity conductors from a power source may be introduced into the head from any of the optional points of entry, and passed from the head to the body portion, for interconnection with the binding posts therein. If the feed section is to serve as a central feed section for other, physically independent wiring systems, electricity conductor jumper cables may be interconnected with the power source conductors within the junction head of the feed section, and carried through the wall thereof and into the junction head of a feed section of such other wiring system, for interconnection with the electricity conductors of the other system.

The conductors of the body portion of the feed section are preferably rigid rods or tubes, arranged in precise registry with the conductors of the adjacent unit of the wiring system. When rods are used, elongated sleeve terminals are provided at the end thereof, whereby electrical connection between the feed section conductors and those of the adjacent unit may advantageously be made by inserting the rod conductors of the adjacent unit into the appropriate sleeves of the feed section conductors.

Other features and advantages will hereinafter appear.

In the accompanying drawings:

Figs. 1 through 4 are illustrative of various ways in which my improved feed section unit may be employed in electric wiring systems;

Fig. 5 is a top plan view of the feed section, with the cover plates of the body and junction box removed;

Fig. 6 is a bottom plan view of the structure of Fig. 5;

Fig. 7 is a bottom plan view of the cover for the connection portion of the feed section;

Fig. 8 is a bottom plan view of the cover plate for the body section;

Fig. 9 is a top plan view of the sub-base of the body section;

Fig. 10 is a vertical section taken through a completely assembled feed section unit; and Fig. 11 is a perspective of a binding post and therewith connected feed section conductor.

Referring to the drawings, Figs. 1 through 4 show typical installations of my improved feed section, wherein 20 represents said sections, 21 a power source cable, illustratively a three-wire cable, and 22 a jumper or the like for interconnecting adjacent feed sections.

Feed section 20 is particularly adaptable for use in electric wiring systems in which a plurality of conductor-containing units, such as are disclosed in my presently co-pending application Serial No. 398,030, filed June 14, 1941 now U. S. Letters Patent No. 2,351,631, dated June 20, 1944, and entitled Electricity conductor units with conductor-size adjustment, are electrically and mechanically interconnected in seriatim to provide an electric wiring system of desired length. With said conductor units 23, Fig. 3, may be included any required number of electrically and mechanically interconnected outlet sections 24.

Said wiring unit sections and outlet provided units include rigid conductors such as rods or tubes of required current-carrying capacity; at one end are sleeves which frictionally receive the solid ends of the conductors of an adjacent unit, whereby a tight frictional fit extending over a substantial area is obtained. Said conductor units 23 or outlet units 24 may be devoid of facilities for direct interconnection with power source connectors, and it is a primary objective of the instant invention to provide a feed section which serves as a junction between the conductors of said seriatim interconnected units and the power source. It is a feature of the invention, also, that the feed sections provide means whereby one of them may serve not only as the junction of the power source conductors with conductor units of one system of interconnected units, but with other systems as well.

In Fig. 1, therefore, is shown a pair of feed sections 20 mounted at the corner junction of a vertical wall; the right-hand unit receives the power source cable 21 and serves as a distributive unit, whereby a jumper 22 may interconnect said feed sections with the common power source 21.

Fig. 2 is similar to Fig. 1, but showing the feed sections 20 as they would be installed on a wall or ceiling, each of said feed sections 20 being potentially the initial unit of an independent run of conductor units.

Fig. 3 shows a feed section 20 mechanically and electrically interconnected with a wiring system including an outlet 24 and a conductor unit 23, said wiring system being served by the power source conductors 21.

Fig. 4 shows an arrangement of three feed sections, in which the center section 20 is a distributor unit for other feed sections 20 extending at an angle thereto.

Fig. 4 also indicates the interconnection of the individual conductors of the power source cable 21 with the conductors of the feed section 20.

Referring to Fig. 10, the connector unit 20 includes a junction head H and a body portion B, said portions having a common base 25. Wall 26 of the body B, see Fig. 5, terminates in a male projection 28 for insertion into a complementary socket construction of outlet 24; the body structure is completed by a sub-base 30, an end 31 of which serves to complete the said male projection 28, see Fig. 10.

Through three of the side walls of the junction head are semi-cylindrical passages 32; the fourth wall communicates with the body portion, see Fig. 5.

The junction head is completed by a cap 33 having semi-cylindrical passages 34, corresponding to the passages 32; when the cap is in position, it cooperates to provide a connection space of relatively large volume, through three walls of which are circular openings for the reception and securement of connector means 35 for the power source conductors 21 or jumpers 22. When less than all of the openings through the junction head wall are in use, the remainder may be closed by any suitable means, such as the plugs 36, Fig. 4.

The interior volume of junction head H is suitable to accommodate a power source conductor 21 and a jumper 22 introduced through each of the side wall passages and mutually electrically interconnected.

In its illustrated form, feed section 20 is suitable for a standard three-wire circuit, and pursuant thereto, electricity conductors 40, 41, 42, are provided, to each of which is connected binding post means 50, 51, and 52. Said conductors and binding post means are removably positioned on sub-base 30; the terminals of said conductors may rest in grooves 43, with which grooves 44, 44a in the under side of base 25 cooperate to form passages within which the terminal end of each conductor is closely confined. The connection terminal of each conductor 40, 41, 42 may be a sleeve 45, for the reception of the end of a corresponding conductor of the unit 24, whereby electrical connection between the feed section and the unit 24 may be obtained.

To insure adequate electrical interconnection between the respective conductors of the feed section 20 and the outlet section 24, the sleeves 45 are sized to engage the conductors of section 24 tightly, and the forcible insertion of such conductors into the sleeves 45 during connection, or the forcible removal during disconnection, imposes substantial longitudinal strains upon the conductors 40, 41, 42. To prevent lateral displacement of said conductors, during the operation of connecting or disconnecting adjacent units, the binding posts 50, 51, 52, are angular, comprising a horizontal leg 50a, 51a, 52a respectively, and a vertical leg 50b, 51b, 52b. To said vertical legs are connected the respective conductors of the feed section; and said vertical legs are positioned between spaced abutments 53, 54, 55, which hold them against displacement. The under side of base 25 may have complementary grooves 54a, 55a, if desired.

As is illustrated in Fig. 5, the binding posts 50, 51, 52 are arranged in a single file, and to position the conductors thereof in parallel spaced relationship, the vertical legs of binding posts 51, 52 extend to the right or left, as necessary.

The base 25 is provided with openings 56, each being of a size to permit the respective binding posts 50, 51, 52, to be snaked therethrough, with a forward edge of said binding posts resting upon said base 25, as shown in Fig. 10. A wall 57 is so arranged that each of the binding posts may be electrically isolated from the other to preclude possibility of short circuiting when the power source conductors are connected thereto.

The sub-base 30 may be secured to the body portion by any suitable means such as machine screws (not illustrated); the cap 33 may be similarly secured to the junction head H.

In employing the invention, a sufficient length of each of the conductors of power source 21 is stripped of insulation to enable it to be connected to the appropriate binding post of the conductors of the feed section, whereupon electrical connection may be obtained by the illustrated clamping screws.

After the connections have been completed, the body portion may be closed with the illustrated cover 58, the forward edge of which has a projecting lug 59 which engages with the under side of the cap 33, see Fig. 10.

In installations wherein the feed section receiving the power source connectors is to be used as a junction box for other wiring systems, the conductors of the appropriate jumper 22 may be electrically connected to the conductors of the power source 21 within the head H by any suitable means.

The feed section may be employed with less than three conductors, as in a two-wire system, merely by removing an appropriate conductors and binding post assembly from the unit, thereby rendering a standard type of feed section unit applicable to either two-wire or three-wire systems.

Advantageously, molded phenolics are employed for the respective members of the feed section unit, rendering it unnecessary to provide means for individually insulating the conductors or the bind post elements thereof.

Whereas I have described my invention by reference to specific forms thereof, it will be understood that many changes and modifications may be made provided they do not depart from the scope of the claims.

I claim:

1. A feed section for an electric wiring system embodying seriatim interconnected conductor-containing units: comprising a substantially fully enclosed, hollow, junction head having access openings at a plurality of positions for the introduction into said head of electricity conductors, removable closure plugs for said access openings, an elongate body portion extending laterally from said head, said body portion including separable base portions defining a chamber extending substantially the length thereof, said body having a contour substantially matching the contour of the units of said wiring system and arranged for mechanical interconnection with an adjacent unit, electricity conductors disposed within the chamber of said body portion and arranged for direct electrical connection with conductors of an adjacent unit, connection means secured to each of said body portion conductors, said conductors and associated connection means being individually removable as a unit, and said body portion being in communication with said head, whereby the conductors introduced into said head may be brought into said body portion for attachment to the connection means therein.

2. A feed section for an electric wiring system, comprising a hollow junction head having apertures through which electricity conductors may be introduced at optional locations, a body portion, a connection well communicating with said junction head, whereby electricity conductors may be brought from said junction head into said connection well, electricity conductors extending longitudinally within said body portion beneath said connection well, means for maintaining said conductors in parallel spaced relationship, said conductors having terminals at an end of said body portion, binding post means secured to each of said conductors and having connection means disposed within said connection well, each said conductor and associated binding post means being removable as a unit from said body portion, wall means of insulation material insulating said binding post means from each other, a removable cap for said junction head, and a removable cover plate for said connection well.

3. In a feed section for an electric wiring system, a connection well having a base of insulation material, an aperture in said base, a sub-base of insulation material disposed beneath said connection well base to define with said base a longitudinally extending chamber, an electricity conductor removably supported on said sub-base within said chamber and extending lengthwise thereof, a binding post attached to said conductor, said binding post having a rigid vertical portion and a therewith related horizontal portion, said horizontal portion being positioned above said base and having connection means accessible within said connection well, and said sub-base having rigid abutments engageable with opposite sides of the vertical portion of said binding post to restrain movement of said binding post with respect to said sub-base.

4. In a feed section for an electric wiring system, a connection well having a base of insulation material, an aperture in said base, a sub-base of insulation material disposed beneath said connection well base to define with said base a longitudinally extending chamber, a rigid electricity conductor removably supported within said chamber on said sub-base and extending lengthwise thereof, a binding post attached to said conductor, said binding post having a rigid vertical portion and a therewith related horizontal portion, said horizontal portion being positioned above said base and having connection means accessible within said connection well, and said sub-base and the base of said connection well having spaced rigid walls engageable with opposite sides of the vertical portion of said binding post to restrain movement of said binding post with respect to said sub-base.

5. A feed section for an electric wiring system, comprising a relatively large junction head having apertures through which electricity conductors may be introduced at optional locations, a body portion extending from said junction head, said body portion having a base and side walls defining a connection well in communication with said head, a sub-base disposed beneath the base of said body portion in spaced relationship therewith to define with said base, a longitudinally extending chamber, and an electricity conductor on said sub-base within said chamber and having a terminal at the end of said body portion, said conductor having, at its opposite end, a binding post having connection means within said connection well and accessible to said junction head, whereby an electricity conductor introduced into said head may be connected to said binding post.

JOSEPH F. O'BRIEN.